Figure 1:
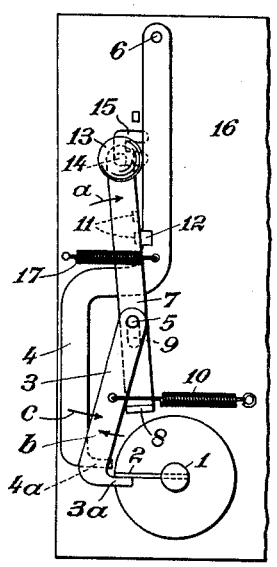

May 22, 1934.   K. MORSBACH   1,960,061
CLOCKWORK MOTION PICTURE CAMERA
Filed June 18, 1930

INVENTOR
KURT MORSBACH
BY
Trika & Kehlenbert
ATTORNEYS.

Patented May 22, 1934

1,960,061

UNITED STATES PATENT OFFICE 1,960,061

CLOCKWORK MOTION PICTURE CAMERA

Kurt Morsbach, Berlin-Lichterfelde, Germany, assignor to Siemens & Halske Aktiengesellschaft, Siemensstadt, near Berlin, Germany, a corporation of Germany Application June 18, 1930, Serial No. 461,880
In Germany July 10, 1929

11 Claims. (Cl. 88—18)

My invention relates to a clockwork motion picture camera, and more particularly to such a camera in combination with a device for taking single pictures in such a manner that motion pictures or single pictures may be taken, as desired, on a film by means of the same objective.

My invention consists in providing a single member for the adjustment of the control gear. This member permits the clockwork or spring-operated mechanism to run for a considerable period so that the camera takes motion pictures, or it adjusts the clockwork so that during each operation it feeds the film forward by the height of a single picture only, the shutter of the objective being simultaneously opened only once for the purpose of exposing the film.

According to one embodiment of my invention a coupling member is interposed between the clockwork on the one hand and the shutter and feed mechanism on the other, so that the latter parts may be operated by a member independent of the clockwork. The shutter for the objective and film feed mechanism for taking motion pictures may also be rendered inoperative and in place of them a special feed mechanism and shutter suitable for taking single pictures rendered operative.

According to another feature of my invention a device may be operated simultaneously with the apparatus for taking single pictures and which provides the film strip with marks by the aid of which the location of the single picture on the film may easily be determined.

Embodiments of my invention are diagrammatically illustrated on the drawing affixed hereto and forming part of my specification. In the drawing.

Figure 2:
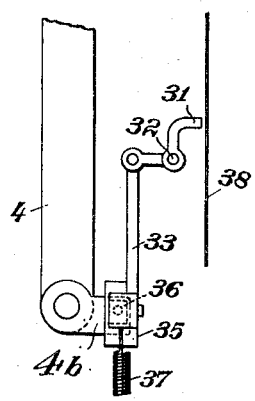
Figure 3:
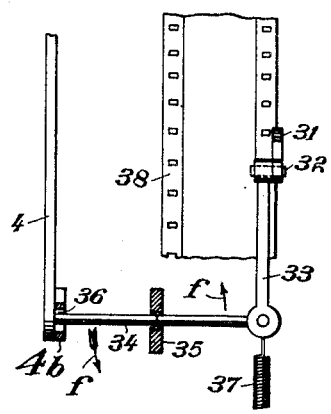

Fig. 1, shows a mechanism by which the clockwork of the camera is so controlled that at one time it serves for taking motion pictures and at another time for taking a single picture, Figs. 2 and 3, show a stamping or punching device by means of which the film pictures which represent a single subject are marked with a depression.

Like parts are marked by like signs of reference throughout all the figures of the drawing.

Referring to Fig. 1 of the drawing, 1 is a shaft adapted to be driven by a clockwork and provided with a stop 2. For the control of the clockwork there are provided two levers 3, 4 terminating at their lower ends in locking noses or lateral projections 3a, 4a. The lever 3, 3a serves for controlling the clockwork when taking motion pictures, the lever 4, 4a for controlling the clockwork when producing single pictures. The lever 3 is pivoted on the pin 5 and the lever 4 on the pin 6. The lever 3 is operated by a lever 7 likewise pivoted on the pin 5 and provided at its lower end with a projecting nose 8. To enable the lever 7 to be displaced longitudinally it is provided with a slot 9 through which the pivot pin 5 passes. A helical spring 10 tends to maintain the lever 3 in the position shown in Fig. 1.

The operating lever 7, intermediate its ends is provided with a nose or projection 11 which in the position of the mechanism shown in Fig. 1 registers with a notch or recess 12 of the control lever 4 for taking single pictures. The lever 7 at the upper end is provided with an operating knob or button 13 projecting from the case of the camera and a guide pin 14. The guide pin 14 is guided in a U-shaped slot 15 of the wall 16 of the camera case. The lever 4 is controlled by a spring 17 which tends to keep it in the position shown in the drawing.

The mode of operation of the described mechanism is as follows:

In the position of the locking levers 3, 3a, 4, 4a shown in Fig. 1, the stop 2 contacts with the nose 3a of the lever 3 so that the clockwork is arrested. If the lever 7 is now turned in the direction of the arrow a in such a manner that the guide pin 14 moves along the lower portion of the U-shaped slot 15, the nose 8 moves the lever 3 in the direction of the arrow b so that the nose 3a is thrown out of engagement with the locking lever 2. The second locking lever 4, 4a is not affected by the movement of the lever 7 since due to the recess 12 in the lever 4 the nose 11 is able to move without effecting said lever 4 as long as the guide pin 14 is located in the lower member of the U-shaped guide 15. By the movement of the arm 3 in the direction of the arrow b the clockwork is released and drives the shutter and the film feed mechanism of the camera continuously as long as the lever 7 has not returned into its starting position shown in Fig. 1. Motion pictures are thus taken.

If it is now desired to take single pictures, the operating lever 7 is raised so that the guide pin 14 comes into engagement with the upper slot of the U-shaped guide recess 15. The displacement of the operating lever 7 upwards is rendered possible by the slot 9 by means of which the lever is pivotally mounted on the pin 5. The nose 11 of the lever 7 passes into the position indicated in dotted lines when the lever is moved upwards. If the lever 7 after having been raised is pivotally operated to cause its pin 14 to move along the upper member of the guide recess 15 in the direction of the arrow a, the locking of the clockwork brought about by the nose 3a is released and the nose 4a is at the same time moved into the path of the stop 2. This takes place because in the raised state of the lever 7 the notch or recess 12 is no longer in alignment with the projection 11 of the lever 7 and the lever 4 is engaged by the projection 11 and shifted thereby in the direction of the arrow a.

The displacement of the guide pin 14 in the direction of the arrow a in the upper slot of the guide recess 15 thus permits the clockwork to make one revolution only, because when the clockwork is started by releasing the nose 3a, the stop 2 encounters the stop nose 4a now located in its path. If the button 13 is moved back into its starting position the nose 4a is released by the action of the spring 17 and the nose 3a brought into the position shown in Fig. 1 so that the stop 2 returns into the position likewise illustrated in Fig. 1. The camera is now ready for taking a single picture if the operation lever 7 remains in the raised position. It may, however, also be used for taking motion pictures by returning the lever 7 into its lower position.

The mechanism illustrated in Fig. 1 of the drawing in which the same clockwork serves for taking motion pictures as well as single pictures is particularly suitable when clockworks with strong springs are employed such as are used for time retarder apparatus, since these works have a very powerful starting torque and are able to overcome the forces of inertia with sufficient speed even for a single revolution of the shaft.

Figs. 2 and 3 of the drawing illustrates a mechanism by means of which the location of the pictures which represent a single subject are marked on the film strip. This mechanism must naturally be brought into operative connection with those parts, the operation of which renders the apparatus suitable for taking single pictures. The mechanism illustrated in Figs. 2 and 3 is in its specific construction intended for apparatus of the construction illustrated in Fig. 1, but it will be readily understood that this mechanism with suitable modifications may equally well be employed for any other embodiments of my invention. The equipment shown in Figs. 2 and 3 comprises a punch 31 which embosses a notch into the film strip as soon as a single subject has been photographed. The punch 31 is designed as a double-armed bellcrank lever adapted to rock around the pivot pin 32. At the free end of the bellcrank is hinged a rod 33 the end of which is pivotally attached to a double-armed lever 34 journaled in a bearing 35. The lever 34 extends into a bore 36 of a locking nose 4b rotatably mounted on the lever 4. The lever 34 is controlled by a spring 37. By the spring 37 which acts upon the lever 34 connected with the locking nose 4b, the locking nose is usually maintained in the position shown in Fig. 2. The film in these Figures 2 and 3 is indicated by the numeral of reference 38.

The mode of operation of this punching device is as follows: if the lever 4, as described above, is brought into the locking position, the nose 4b will thereby be moved into the path of the stop 2 in the same way as previously described with respect to the nose 4a; as a result said stop 2 will impact against the nose 4b after the shaft 1 completes a revolution. Since considerable mass forces of the clockwork and the centrifugal governor are developed during such operation, the impact of the stop 2 against the nose 4b will be sufficient to pivotally operate the nose 4b and overcome the force of the spring 37 in the first moment so that the lever 34 is rocked on the bearing 35 in the direction of the arrow f, this causes the rod 33 to move upwardly and swing the bellcrank lever in a direction to cause the point of the punch 31 to produce a notch or depression in the surface of the film strip. As soon as the above operations have taken place the spring 37 overcomes the power of the clockwork to such an extent that the nose 4b is turned back into its position shown in Fig. 2 and simultaneously the punch 31 is withdrawn from the film strip so that the gripper, not shown in the drawing, is free to feed the film strip forward by the dimensions of one picture.

It will be understood that the marking or punching device which fixes the position of the single pictures on the film strip need not necessarily be mechanical in construction but might be so designed that an indication mark is photographed on to the film strip by the action of light.

Other structural modifications will suggest themselves to those skilled in the art and may be employed without departing from the spirit of my invention and the ambit of the appended claims.

I claim as my invention:

1. In a motion picture camera including a casing and provided with a spring motor drive, a rotating stop driven by said spring motor, two adjustable levers pivotally mounted in said casing, one of said levers being normally located in the path of said stop to hold the spring motor stationary, and a single movable controlling member adapted by movement to one position to independently shift said one lever out of the path of said stop to permit said spring motor to operate the camera for taking moving pictures, and by a different movement to concurrently shift said one lever out of the path of said stop and the other lever into said path to arrest the operation of said spring motor after one revolution of said stop whereby said camera is operated to take individual pictures, the movements of said levers and controlling member being parallel to the plane of a wall of said camera.

2. In a motion picture camera with a spring motor drive, a rotating stop driven by said spring motor, a pivoted first lever normally located in the path of said stop to hold the spring motor stationary, a pivoted second lever normally located out of the path of said stop, and a single movable controlling member adjustable to two different positions, and adapted in one position to pivotally shift said first lever, independently of said second lever, out of the path of said stop to permit said spring motor to operate said camera for taking moving pictures, and in the other position to concurrently swing said levers in opposite directions whereby the first lever is shifted out of the path of said stop and the second lever is simultaneously shifted into said path to arrest the operation of said spring motor after one revolution of said stop to operate the camera for taking individual pictures.

3. In a motion picture camera including a casing and provided with a spring motor drive, a rotating stop driven by said spring motor, two adjustable levers pivotally mounted on the casing, one of said levers being normally located in the path of said stop to hold the spring motor stationary, a single controlling member for shifting said one lever to permit the spring motor to run, and for shifting the other lever to arrest the operation of said spring motor after one revolution of said stop, whereby said camera may be selectively set for the taking of moving or individual pictures, and a marking device controlled by said other lever for marking the film strip simultaneously with the taking of individual pictures to determine the location of said individual pictures on said film strip.

4. In a motion picture camera including a casing and provided with a spring motor drive, a rotating stop driven by said spring motor, two adjustable levers pivotally mounted on the casing, one of said levers being normally located in the path of said stop to hold the spring motor stationary, a single controlling member adapted to independently shift said one lever to permit said spring motor to operate the camera for taking moving pictures, and to concurrently shift said one lever out of the path of said stop and the other lever into said path to arrest the operation of said spring motor after one revolution of said stop whereby said camera is operated to take individual pictures, the movements of said levers and controlling member being parallel to the plane of a wall of said camera, and a marking device controlled by said other lever for marking the film strip simultaneously with the taking of individual pictures to determine the location of said individual pictures on said film strip.

5. In a motion picture camera with a spring motor drive, a rotating stop driven by said spring motor, a pivoted first lever normally located in the path of said stop to hold the spring motor stationary, a pivoted second lever normally located out of the path of said stop, a single movable controlling member adjustable to two different positions, and adapted in one position to pivotally shift said first lever, independently of said second lever, out of the path of said stop to permit said spring motor to operate said camera for taking moving pictures, and in the other position to concurrently swing said levers in opposite directions whereby the first lever is shifted out of the path of said stop and the second lever is simultaneously shifted into said path to arrest the operation of the spring motor after one revolution of said stop to operate the camera for taking individual pictures, and a marking device controlled by said second lever for marking the film strip simultaneously with the taking of individual pictures to determine the location of said individual pictures on said film strip.

6. In a motion picture camera with a spring motor drive, a rotating stop driven by said spring motor, two adjustable levers, one of which is normally located in the path of said stop to hold the spring motor stationary, a single controlling member for shifting said one lever to permit the spring motor to run, and for shifting the other lever to arrest the operation of said spring motor after one revolution of said stop, whereby said camera may be selectively set for the taking of moving or individual pictures, and a punching device connected with and controlled by said other lever for marking the film strip simultaneously with the taking of individual pictures to determine the location of said individual pictures on said film strip.

7. In a motion picture camera with a spring motor drive, a rotating stop driven by said spring motor, two adjustable levers, one of which is normally located in the path of said stop to hold the spring motor stationary, a single controlling member adapted to independently shift said one lever to permit said spring motor to operate the camera for taking moving pictures, and to concurrently shift said one lever out of the path of said stop and the other lever into said path to arrest the operation of said spring motor after one revolution of said stop whereby said camera is operated to take individual pictures, the movements of said levers and controlling member being parallel to the plane of a wall of said camera, and a punching device connected with and controlled by said other lever for marking the film strip simultaneously with the taking of individual pictures to determine the location of said individual pictures on said film strip.

8. In a motion picture camera with a spring motor drive, a rotating stop driven by said spring motor, a pivoted first lever normally located in the path of said stop to hold the spring motor stationary, a pivoted second lever normally located out of the path of said stop, a single movable controlling member adjustable to two different positions, and adapted in one position to pivotally shift said first lever, independently of said second lever, out of the path of said stop to permit said spring motor to operate said camera for taking moving pictures, and in the other position to concurrently swing said levers in opposite directions whereby the first lever is shifted out of the path of said stop and the second lever is simultaneously shifted into said path to arrest the operation of the spring motor after one revolution of said stop to operate the camera for taking individual pictures, and a punching device connected with and controlled by said second lever for marking the film strip simultaneously with the taking of individual pictures to determine the location of said individual pictures on said film strip.

9. In a motion picture camera with a spring motor drive including a speed governor, a rotating stop driven by said spring motor, two adjustable levers, one of which is normally located in the path of said stop to hold said spring motor stationary, a single controlling member for shifting said one lever to permit the spring motor to run, and for shifting the other lever to arrest the operation of said spring motor after one revolution of said stop, whereby said camera may be selectively set for the taking of moving or individual pictures, a punching device connected with and controlled by said other lever for marking the film strip simultaneously with the taking of individual pictures to determine the location of said individual pictures on said film strip, and a spring for controlling said punching device, the power of which spring is adapted to be overcome by the sum of the power of the spring motor and the forces of inertia developed during the braking of the spring motor and the speed governor, but the power of which spring is greater than that of the spring motor.

10. In a motion picture camera with a spring motor drive including a speed governor, a rotating stop driven by said spring motor, two adjustable levers, one of which is normally located in the path of said stop to hold said spring motor stationary, a single controlling member adapted to independently shift said one lever to permit the spring motor to operate the camera for taking moving pictures and to concurrently shift said one lever out of the path of said stop and the other lever into said path to arrest the operation of said spring motor after one revolution of said stop whereby said camera is operated to take individual pictures, the movements of said levers and controlling member being parallel to the plane of a wall of said camera, a punching device connected with and controlled by said other lever for marking the film strip simultaneously with the taking of individual pictures to determine the location of said individual pictures on said film strip, and a spring for controlling said punching device, the power of which spring is adapted to be overcome by the sum of the power of the spring motor and the forces of inertia developed during the braking of the spring motor and the speed governor, but the power of which spring is greater than that of the spring motor.

11. In a motion picture camera with a spring motor drive including a speed governor, a rotating stop driven by said spring motor, a pivoted first lever normally located in the path of said stop to hold the spring motor stationary, a pivoted second lever normally located out of the path of said stop, a single movable controlling member adjustable to two different positions, and adapted in one position to pivotally shift said first lever, independently of said second lever, out of the path of said stop to permit said spring motor to operate said camera for taking moving pictures, and in the other position to concurrently swing said levers in opposite directions whereby the first lever is shifted out of the path of said stop and the second lever is simultaneously shifted into said path to arrest the operation of said spring motor after one revolution of said stop to operate the camera for taking individual pictures, a punching device connected with and controlled by said second lever for marking the film strip simultaneously with the taking of individual pictures to determine the location of said individual pictures on said film strip, and a spring for controlling said punching device, the power of which spring is adapted to be overcome by the sum of the power of the spring motor and the forces of inertia developed during the braking of the spring motor and the speed governor, but the power of which spring is greater than that of the spring motor.

KURT MORSBACH.